(12) United States Patent
Teshima et al.

(10) Patent No.: US 7,726,006 B2
(45) Date of Patent: Jun. 1, 2010

(54) METHOD OF MANUFACTURING STATOR UNIT, AND MOTOR USING THE STATOR

(75) Inventors: Hiroyoshi Teshima, Kyoto (JP); Kazumi Takeshita, Kyoto (JP); Hideaki Konishi, Kusatsu (JP); Kiyoto Ida, Kyoto (JP); Tsukasa Takaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 730 days.

(21) Appl. No.: 11/482,837

(22) Filed: Jul. 10, 2006

(65) Prior Publication Data

US 2007/0007834 A1  Jan. 11, 2007

(30) Foreign Application Priority Data

Jul. 11, 2005 (JP) ............................. 2005-201753
Jun. 30, 2006 (JP) ............................. 2006-180727

(51) Int. Cl.
 *H02K 15/00* (2006.01)
(52) U.S. Cl. .................. 29/596; 29/598; 29/597; 29/605; 29/732; 310/89
(58) Field of Classification Search ........... 29/596–598, 29/605–606, 732, 840; 310/42, 89, 71; 242/433, 242/440.1
See application file for complete search history.

(56) References Cited

U.S. PATENT DOCUMENTS 4,716,648 A * 1/1988 Nel ............................. 29/596
4,934,041 A * 6/1990 Hoover et al. ................. 29/596

FOREIGN PATENT DOCUMENTS

| JP | 61-266828 A | 11/1986 |
|---|---|---|
| JP | 5-11779 U | 2/1993 |
| JP | 5-236692 A | 9/1993 |
| JP | 5-244757 A | 9/1993 |
| JP | 5-95163 U | 12/1993 |
| JP | 6-233483 A | 8/1994 |
| JP | 6-327179 A | 11/1994 |
| JP | 6-327209 A | 11/1994 |
| JP | 7-284239 A | 10/1995 |
| JP | 11-234945 A | 8/1999 |
| JP | 2000-287403 A | 10/2000 |
| JP | 2002-78271 A | 3/2002 |

* cited by examiner

*Primary Examiner*—Minh Trinh
(74) *Attorney, Agent, or Firm*—Westerman, Hattori, Daniels & Adrian, LLP

(57) ABSTRACT

In manufacturing of the stator unit 2 according to one preferred embodiment of the present invention, a plurality of terminal pins are arranged in an axially spaced manner from a plurality of the coils during a twining process of the wires from the coils 232 to the terminal pins 241. Then, after the wire is twined to the terminal pins, the terminal pins connected to the coils are moved along the outer side face of the sleeve housing, functioning to as a guide portion 2201 for the terminal pins. By virtue of the configuration, the terminal pins 241 may be approximated to the coils without applying the tension on wire, and the stator unit may be made thin with preventing the open circuit of the wires.

17 Claims, 12 Drawing Sheets

METHOD OF MANUFACTURING STATOR UNIT, AND MOTOR USING THE STATOR

FIELD OF THE INVENTION

The present invention generally relates a method of manufacturing a stator unit and an electrically powered motor using the stator unit.

BACKGROUND OF THE INVENTION

Conventionally, axial fans and centrifugal fans used for cooling electric devices are driven by electrically powered motors. Such a motor includes a rotor unit having a rotor magnet around a center axis of the motor and a stator unit having a stator generating torque between the rotor unit and the stator unit. The stator unit includes a plurality of coils formed by winding wires around a plurality of teeth. The ends of the wires wound around the teeth are electrically connected to a circuit board such that the electricity is provided to the stator.

There are various methods of connecting the ends of the wires forming the coils and the circuit board. In a publicly available example of such method, firstly, a conductive pin axially protruding from the bottom side of the stator toward the circuit board is provided. Then, after twining the wire to the pin at below the stator, the pin is inserted into the bore provided on the circuit board and soldered.

Recently, the electronic devices are designed so as to miniaturize their dimensions, and the demands for small cooling fans have been rising. In such a small motor, the space between the pin to which the wire is twined and such as the stator core, the coil and the circuit board is so narrow that the needle of the wire-winding machine can not be easily placed therebetween. Therefore, it is difficult to mechanize (automate) the twining process of the wire.

In addition, the wires used for the small motor have so small diameters that they may cut during the process of attaching the wires to the circuit board. For example, in the motor using the conductive pin as mentioned above, the wire may cut, during the process of inserting the pin, to which the wire is twined, into the bore provided on the circuit board, by scratching the wire with the edge of the bore.

SUMMARY OF THE INVENTION

Preferred embodiments of the present invention provide a stator unit and a method of manufacturing the stator unit which facilitate manufacturing of the stator unit, especially facilitate the process of twining the wire from the coil to the terminal pin with preventing the open circuit of the wire.

In a stator unit according to one preferred embodiment of the present invention, a plurality of teeth and a plurality of terminal pins are axially spaced manner such that a needle of a wire-winding machine can be placed therebetween. After a plurality of coils are formed by winding wires around the plurality of teeth with the wire-winding machine, the wires from the coils are easily twined and connected to the terminal pins. Then the terminal pins are moved along a guide portion to bring it to the coils. Therefore, the manufacturing of the stator unit may be automated with preventing the wire from being cut, and the manufacturing of the stator unit may be facilitated.

According to another preferred embodiment of the present invention, in the manufacturing method of the stator unit, the terminal pins may be brought close the coils with rotating the terminal pins into a circumferential direction, centering on the center axis, along the outer side face of the sleeve housing. As a result, the terminal pins are approximated to the coils without applying unnecessary tension on the wires. Therefore, it is possible to make the motor thin and to prevent the wire from being cut.

It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
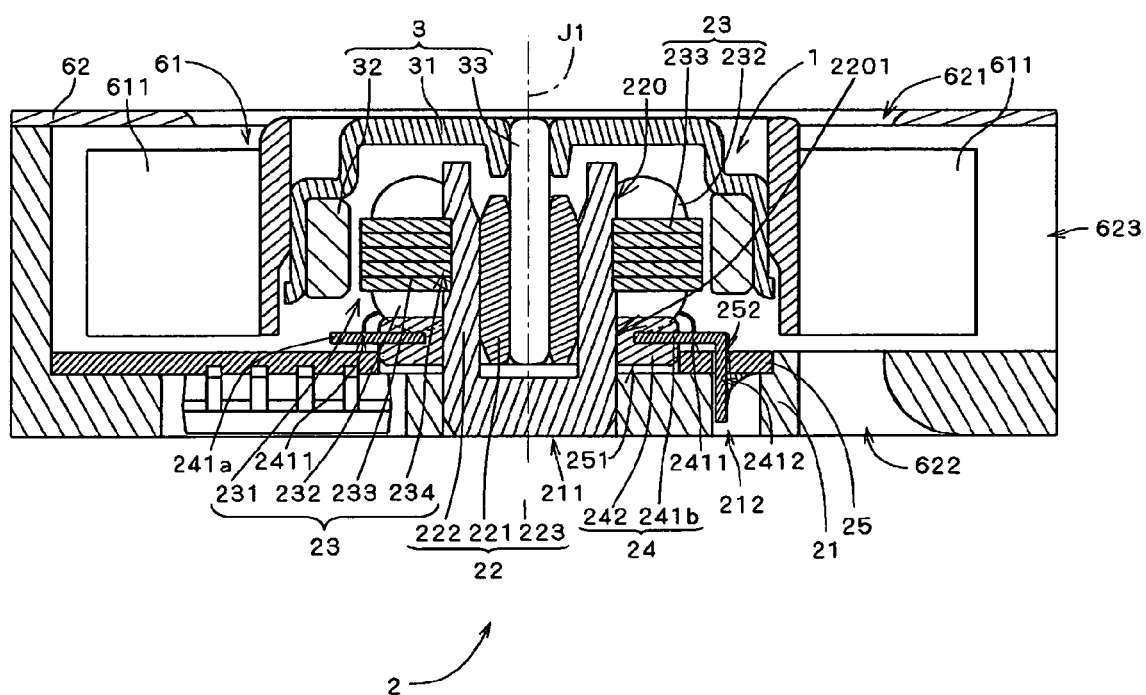
FIG. 1 is a vertical sectional view illustrating a centrifugal fan according to a first preferred embodiment of the present invention.

A preferred embodiment of the present invention will be described with referring to the figures. It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated.

First Preferred Embodiment

FIG. 1 is a vertical sectional view of an electrically powered motor 1 along a plane including a center axis J1, illustrating an internal configuration of a centrifugal fan 60 according to a first preferred embodiment of the present invention. The centrifugal fan 60 is, for example, used for an air-cooling fan for an electronic device and includes an impeller portion 61, a small motor 1 and a housing 62.

The impeller portion 61 rotates and generates air-flow. The impeller portion 61 is attached to the motor 1 and rotated with centering on the center axis J1. The housing 62 surrounds the impeller portion 61 and the motor 1 and defines a passage of the air-flow. Meanwhile, the housing 62 controls the air-flow generated by the rotation of the impeller portion 61 and air is sent forth therethrough.

As shown in FIG. 1, the motor 1 is an outer rotor motor, and includes a stator unit 2 which is a stationary assembly and a rotor unit 3 which is a rotatable assembly. Via a bearing mechanism employing hydrodynamic pressure by the agency of lubricant oil, the rotor unit 3 is rotatably supported on the stator unit 2, with a center axis J1 as center. For convenience in the following explanation, the rotor unit 3 side of the motor 1 will be described as the upper end and the stator unit 2 side as the lower end, but the center axis J1 need not necessarily coincide with the direction of gravity.

The impeller portion 61 is attached to an outer circumference of the rotor unit 3 of the motor 1, and includes a plurality of blades 611. The plurality of blades 611 are arranged in a circumferential direction centering on the center axis J1 and are arranged so as to be substantially parallel to the center axis J1.

The housing 62 has a substantially rectangular shape, and an upper face and a bottom face thereof include air intakes 621 and 622 respectively, and the side face thereof includes an air outlet 623. The motor 1 is attached to an inside face of the bottom portion of the housing 62. The bottom portion of the housing 62 is a base portion which retains the different parts of the stator unit 2 as described later (hereinafter referred to as a base portion 21).

In the centrifugal fan 60, the impeller 61 rotates with the rotor unit 3 of the motor 1 to take the air into the housing 62 from the air intakes 621 and 622. Then, the air is guided into radially outward direction, away from the center axis J1, and the air blows to the outside of the housing 62 through the air outlet 623.

The rotor unit 3 is furnished with a rotor hub 31 that retains the different parts of the rotor unit 3, a rotor magnet 32 attached to the rotor hub 31 so as to encircle the center axis J1, and a shaft 33 downwardly protruding the rotor hub 31 at a center portion of the rotor hub 31. The shaft 33 has a substantially cylindrical shape centering on the center axis J1. Also, the shaft 33 is press-fitted and is adhered in an opening provided at the center portion of the rotor hub 31.

The stator unit 2 includes the base portion 21 that is also the base of the housing 62, a sleeve unit 22 and a stator 23. The sleeve unit 22 has a cylindrical shape into which the shaft 33 of the rotor unit 3 is inserted. The shaft 33 is inserted into the inner circumferential portion of the sleeve unit 22 such that the rotor unit 3 is rotatably supported. The stator 23 is attached to a substantially cylindrical outer side face 220 of the sleeve unit 22 (it is also an outer side face of a sleeve housing 222 described later).

The sleeve unit 22 includes a sleeve 221 that is a substantially-cylindrical oil-impregnated bearing into which the shaft 33 is inserted and a sleeve housing 222 that has a cylindrical shape with a base into which the sleeve 221 is press-fitted and fixed. The sleeve unit 22 is inserted into a base opening 211 formed on the base portion 21 and is attached to the base portion 21.

The sleeve 221 is a porous component, formed by putting a powdered starting material into a mold and press-hardening the material to pressure-mold it, and then sintering the compact and putting the sintered compact again into a mold to compress it into a final form. Various kinds of metal powders, powders of metallic compounds, powders of non-metallic compounds, etc. may be used as the starting material for forming the sleeve 221 (for example: a blend of iron (Fe) and copper (Cu) powders; a blend of copper and tin (Sn) powders; a blend of copper, tin and lead (Pb) powders; or a blend of iron and carbon (C) powders).

The sleeve housing 222 is made of a resin (such as Polyphenylene Sulfide (PPS) and Liquid Crystal Polymer (LCP)). A thrust plate 223 is provided on an inner bottom surface of the sleeve housing 222 (i.e., between the inner bottom surface of the sleeve housing 222 and a bottom end of the sleeve 221).

Gaps are provided between the outer circumferential surface of the shaft 33 and the inner circumferential surface of the sleeve 221, and between the bottom end surface of the shaft 33 and the upper surface of the thrust plate 223, and those gaps are filled with the lubricant oil as working fluid. Thus when the rotor unit 3 is spinning, hydrodynamic pressure is exploited to support the rotor unit 3 through the lubricant oil.

Meanwhile, the shaft 33, the sleeve unit 22 (the sleeve 221 and the sleeve housing 222), and thrust plates 223 are the bearing mechanism that rotatably support the rotor unit 3 to stator unit 2. The radial hydrodynamic bearing portion is constituted with a gap between an outer circumferential face of the shaft 33 and an inner circumferential face of the sleeve 221, and the thrust hydrodynamic bearing portion is constituted with a gap between a bottom end face of the shaft 33 and an upper surface of the thrust plate 223.

Figure 2:
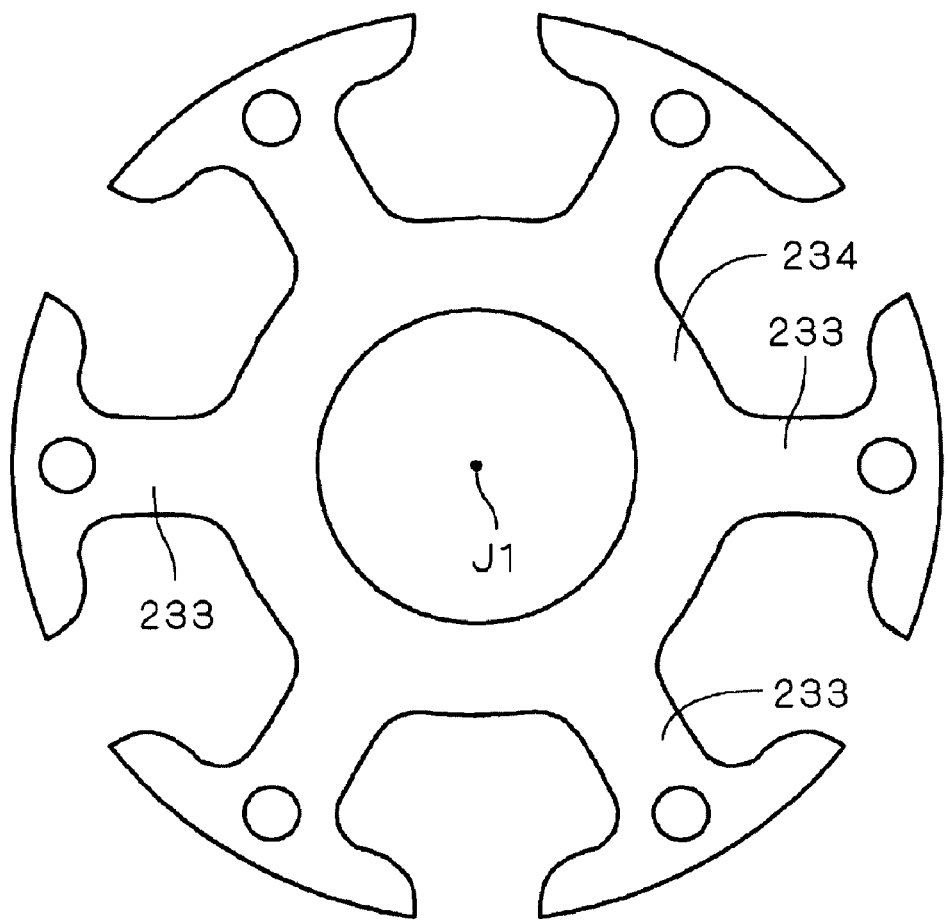
FIG. 2 is a plain view illustrating a stator core.

The stator 23 includes a stator core 231 which is formed by accumulating a plurality of core plates (five core plates n this preferred embodiment) made of the silicon steel plate. FIG. 2 is a plain view illustrating the stator core 231. The stator core 231 includes a plurality of radially disposed teeth 233 (six teeth in this preferred embodiment) with the center axis J1 as center, and with an annular core back 234 that supports the plurality of teeth 233 along an inner circumferential side thereof. The core back 234 supports the plurality teeth 233 by linking the end portions of the teeth 233 on the side nearer from the center axis J1. In this preferred embodiment, an outside diameter of the stator core 231, a diameter of the virtual circle linking the end portions of the teeth 233 on the side further from the center axis J1, is about 5 mm.

In each of the core plates, the portions that correspond respectively to the plurality of teeth 233 and to the core back 234 are formed unitarily, by virtue of which the plurality of teeth 233 and the core back 234 are magnetically connected. In the stator unit 2, the core back 234 of the stator core 231 is attached to the outside face 220 of the sleeve housing 222 by insert molding, the sleeve housing 222 axially extending with centering on the center axis J1, as shown in FIG. 1. Moreover, an insulation layer is formed on the surface of each of teeth 233.

The stator 23 includes a plurality of coils 232 (six coils in this preferred embodiments) formed by winding the wire (the diameter is from about 0.03 mm to 0.05 mm) around each of the plurality of teeth 233 of the stator core 231 so as to form multilayer of the wire.

The stator unit 2 further includes a terminal 24 and a circuit board 25. The terminal 24 is attached to the outside face 220 of the sleeve housing 222 below the stator 23, and the wires extracted from the coils 232 of stator 23 are connected to the terminal 24. The circuit board 25 is disposed between the base portion 21 and the terminal 24, and is electrically connected to the stator 23 through the terminal 24. In this preferred embodiment, an axial distance along the center axis J1 between a bottom face of the teeth 233 of the stator 23 and an upper face of the circuit board 25 is about 1.3 mm.

The circuit board 25 includes a circuit board opening 251 having a larger diameter than the base opening 211 of the base portion 21, axially downwardly continuous from the base opening 21. The sleeve housing 222 is inserted into the circuit board opening 251 of the circuit board 25 and the base opening 21 of the base 21. In the motor 1, the stator 23, between itself and the rotor magnet 32 disposed encircling the shaft 311, generates torque centering on the center axis J1 by applying the driving current to the stator 23 of the stator unit 2 through the circuit board 25.

Figure 3:
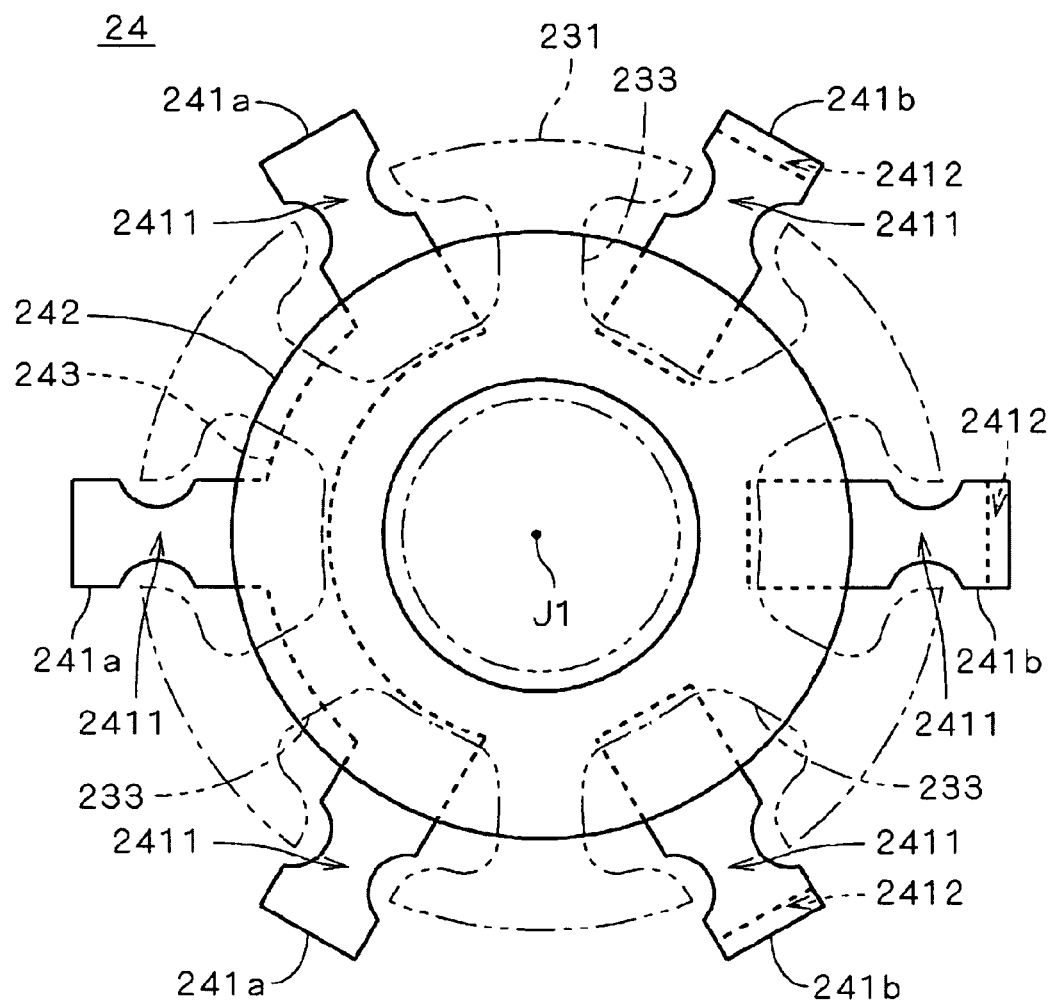
FIG. 3 is a plain view illustrating a terminal.

FIG. 3 is a plain view illustrating the terminal 24. As shown in FIG. 1 and FIG. 3, the terminal 24 is arranged under the plurality of coils 232.

The terminal 24 includes a plurality of terminal pins 241a and 241b, and a substantially annular pin supporting portion 242. The plurality of terminal pins 241a and 241b are a plurality of conductive metal pieces (six pieces in this preferred embodiment) to which the end portions of the wires from the plurality of coils 232 are electrically connected. The pin supporting portion 242 is formed by resin so as to unitarily support the plurality of terminal pins 241a and 241b with insulating the plurality of terminal pins 241a and 241b each other.

In FIG. 3, the stator core 231 arranged above the terminal 24 is illustrated with two-dot chain line. The plurality of teeth 233 of the stator core 231, and the plurality of the terminal pins 241a and 241b of the terminal 24 are arranged in an equally spaced manner in the circumferential direction (60 degree in this preferred embodiment) centering on the center axis J1 as shown in FIG. 3. Each of the teeth 233 and each of terminal pins 241a and 241b are alternately arranged in a circumferentially spaced manner by 30 degree. In FIG. 1, the teeth 233, the terminal pins 241a and 241b are shown on the same sectional plane for the convenience of illustration (same to those as FIG. 9 to FIG. 11).

In the motor 1, the six coils 232 are connected in a star configuration (Y configuration) and the stator 23 is driven by a three phase AC power supply. In stator 23, one of two coils 232 of each phase (U phase, V phase, and W phase) is connected to the terminal pin 241a, and the other is connected to the terminal pin 241b. Three terminal pins 241a, including the one from each phase, are electrically connected each other and form a neutral point (so called a common point). Hereinafter, the terminal pin 241a is referred to as a common terminal pin 241a.

As shown in FIG. 3, a common terminal joint 243 is provided to the stator 3. The common terminal joint 243, which is arranged inwardly from the pin support portion 242, unitarily supports the three common terminal pins 241a at their center axis J1 sides. Six teeth 233, twice the number of the phase of the drive current, are provided to the stator 23. Therefore, by adjacently arranging three common terminal pins 241a, they may be easily connected with the common terminal joint 243. Even in case that there are common terminal pins 241a as many as three or more times of the number of phase of the drive current, the common terminal pins may be easily connected each other by arranging them adjacently.

Meanwhile, three terminal pins 241b are independent each other and are supported by the pin supporting portion 242 in the terminal 24, and these terminal pins 241b are hereinafter referred to as independent terminal pins 241b. In case that it is not necessary to make a clear distinction between the common terminal pins 241a and the independent terminal pins 241b, these pins may be simply referred to as terminal pins 241.

As shown in FIG. 1 and FIG. 3, in the terminal 24, the plurality of terminal pins 241, the common terminal joint 243, and the pin supporting portion 242 are joined by insert molding. Each of a plurality of terminal pins 241 (i.e., common terminal pins 241a and independent terminal pins 241b) extends in the radial direction with centering on the center axis J1. Each of the terminal pins 241 includes a wire connecting portion 2411, to which the wire from the corresponding coil 232 is electrically connected by twining the wire. The width of wire connecting portion 2411 is narrower than that of a portion radially inner or radial outer from the wire connecting portion 2411 so that the wire twined thereto does not shift into the radial direction.

Meanwhile, each of three independent terminal pins 241b is bent about 90 degree at a radially outside portion (further side from the center axis J1) of the wire connecting portion 2411, such that tip ends of the independent terminal pins 241b may face to the circuit board 25. The bent portions 2412 are inserted into substrate bores 252 provided on the circuit board 25 and base bores 212 of base portion 21, having an axially continuous portion each other. Then, the bent portions 2412 are electrically connected to electrodes on a bottom face of the circuit board 25 with solder. The bent portions 2412 of the independent terminal pins 241b are hereinafter referred to as substrate joints 2412. Each of the substrate joints 2412 extends into a direction, substantially parallel to the center axis J1.

In the stator unit 2, as shown in FIG. 1, the sleeve housing 222 is inserted into the inner side of the pin supporting portion 242. The pin supporting portion 242 is attached to the outer side face 220 of the substantially cylindrical sleeve housing 222, and the bottom portion of the pin supporting portion 242 is recessed in the circuit board opening 251 of the circuit board 25. In addition, concave portions are provided to an upper side of the pin supporting portion 242, arranged to positions corresponding to those of coils 232, and the bottom portions of the coils 232 are arranged in the concave portions.

Figure 4:
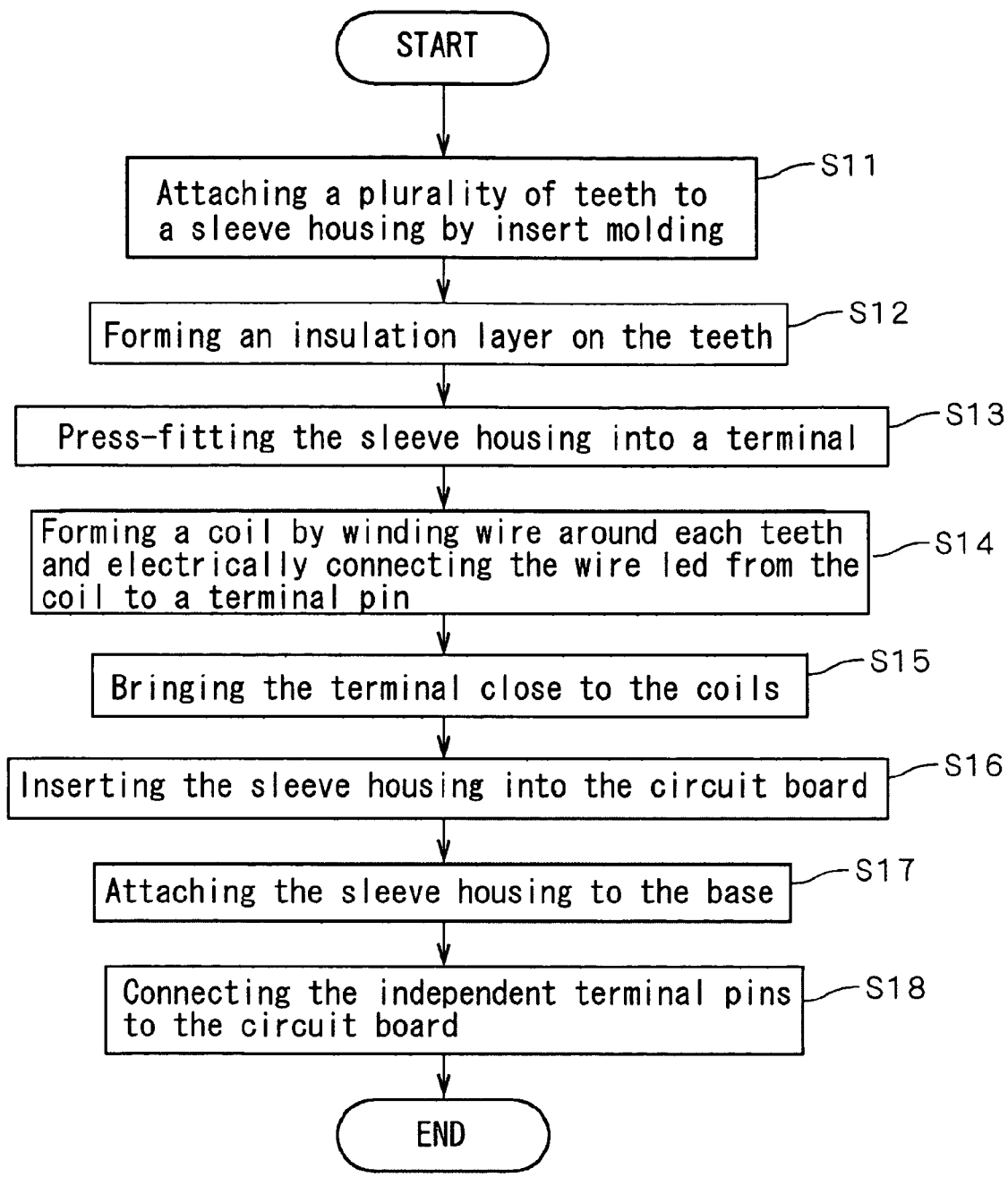
FIG. 4 is a chart showing a process flow in manufacturing a stator unit.
Figure 5:
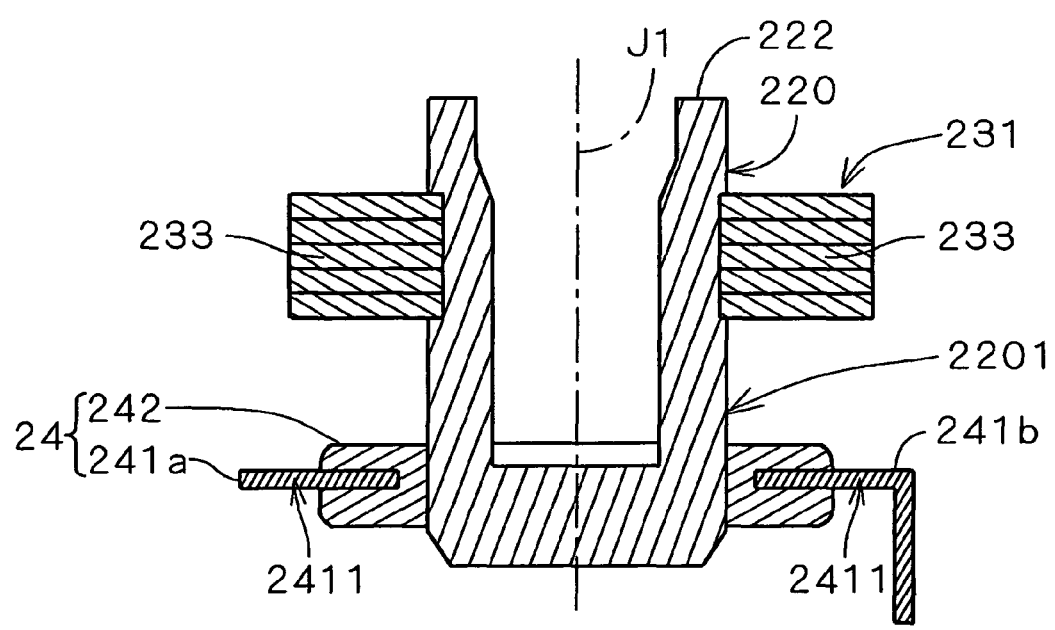
FIG. 5 is a view illustrating the stator unit during the manufacturing process thereof.

Next, manufacturing of the sleeve unit 22 will be explained. FIG. 4 is a chart showing a process flow in manufacturing the stator unit 2. FIGS. 5 to 8 are a view illustrating the stator unit during the various manufacturing processes thereof.

In manufacturing the stator unit 2, firstly the sleeve housing 222 is formed by insert molding and concurrently, the plurality of teeth 233 are attached to the outer side face 220 of the sleeve housing 222 by attaching the core back 234 to the sleeve housing 222 (step S11). Specifically, the stator core 231 is arranged within a die having an internal space in a predetermined shape, and the resin material melted by heating is injected from a plurality of gates to fill the internal space of the die with the melted resin material.

Subsequently, the chemical conversion coating is formed on the stator core 231 (i.e., on the plurality of teeth 233) fixed to the sleeve housing 222, thereby the insulation layer is formed on the surface of a plurality of teeth 233 (step S12). From the viewpoint of improving the efficiency of the motor 1 by increasing the number of windings of the coil 232 on the teeth 233, it is preferred that the insulation layer formed on the surface of teeth 233 is made thin. Therefore, the suitable method to form the thin film, such as electro deposition, is used as a processing method of chemical conversion coating. Meanwhile, it is desirable that the sleeve housing 222 is made of the material such as Polyphenylene Sulfide (PPS) and Liquid Crystalline Polymer (LCP) having excellent chemical resistance in order to resist the chemical processes such as acid cleaning which is performed as a pre-washing process of the electro deposition.

After forming the insulation layer on the surface of each teeth 233, the sleeve housing 222 is press-fitted into the pin supporting portion 242 of the terminal 24 from the bottom side thereof (i.e., one end side eventually attached to base portion 21).

As explained above, the terminal 24 is attached to the outside face 220 of the sleeve housing 222 (step S13). At this time, the terminal 24 is arranged in an axially spaced manner under the stator core 231. The axial distances in the center axis J1 direction between the bottom faces of teeth 233 and the wire connecting portions 2411, provided on the common terminal pins 241a and the independent terminal pins 241b, are bigger than the predetermined distance. More-than-predetermined distance is greater than about 1.5 mm such that a nozzle of a winding machine may be inserted therebetween, and more preferably, the distance D between the stator core 231 and the terminal 24 is greater than about 2 mm. In addition, the terminal 24 may be moved into the center axis J1 direction (axial direction) along the outer side face 220 of the sleeve housing 222.

After press-fitting the sleeve housing 222 into the terminal 24, the wires are wound around the insulation layer on the teeth 233 to form the coils 232 by using the winding machine, which winds wires in a multilayer manner around the teeth 233 while moving along the outer circumferences of the teeth 233

Figure 6:
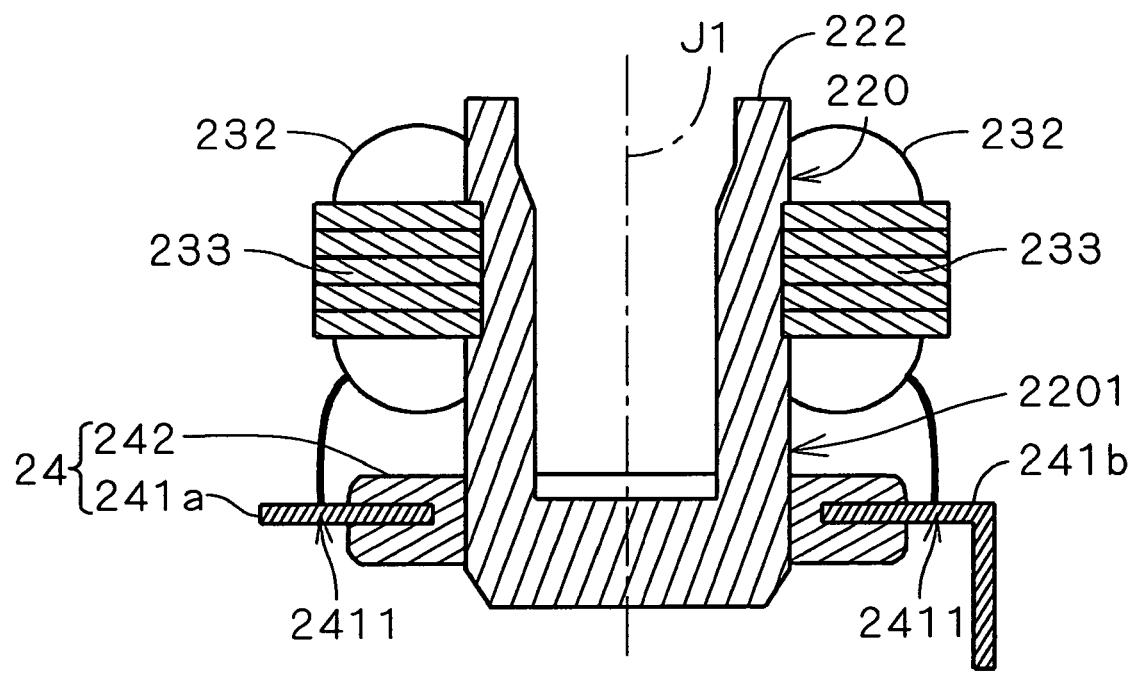
FIG. 6 is a view illustrating the stator unit during the manufacturing process thereof.

Subsequently, the winding machine moves toward the terminal 24, and as shown in FIG. 6, the wires from coils 232 are twined to the wire connecting portions 2411 of the terminal pins 241, corresponding to the teeth 233 on which the coils 232 are formed (i.e., the common terminal pins 241a or the independent terminal pins 241b).

In this preferred embodiment of the present invention, the wires from the coils 232 are wound four times around the wire connecting portions 2411. Afterwards, the wires are electrically connected to wire connecting portions 2411 of terminal pins 241 by fusing.

The wires may be connected to the terminal pins 241 by such as spot welding, laser welding and soldering. However, fusing may be preferable from the viewpoint of preventing the wires of the motor 1 from becoming thinner during the connecting process.

The coils 232 are formed on six teeth 233 respectively, and the wire from each coil 232 is twined to the corresponding terminal pin 241. Then, the wires are electrically connected to wire connecting portions 2411 by fusing (step S14). In manufacturing of the stator unit 2, the wires are wound around the teeth 233 so that the coils 232 are formed.

Figure 7:
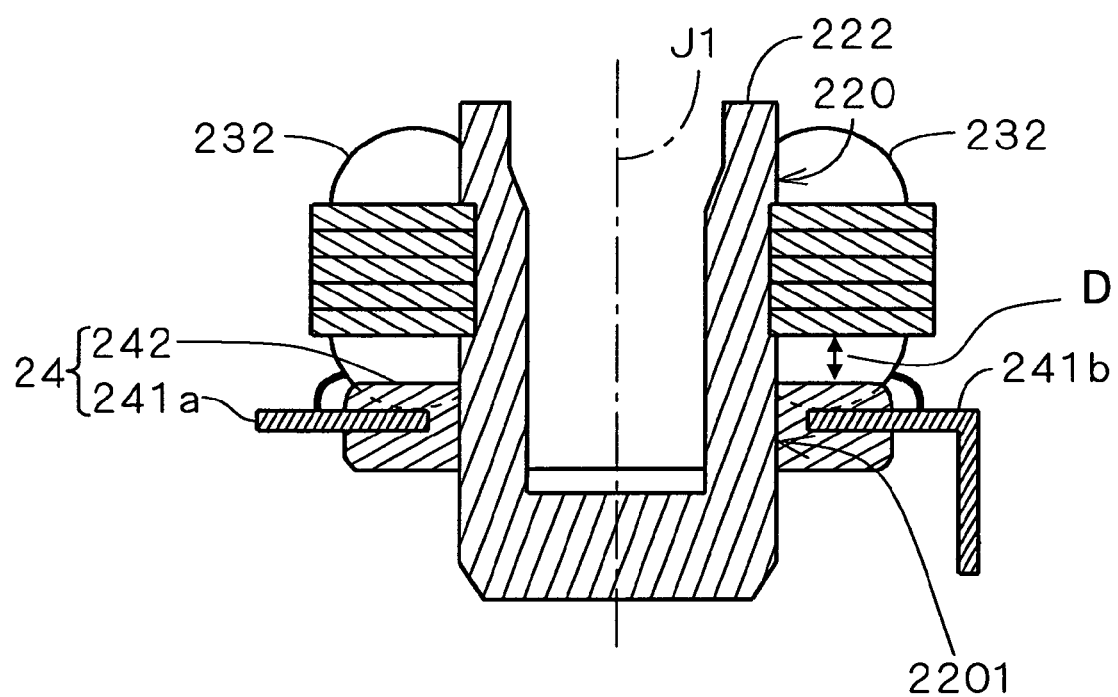
FIG. 7 is a view illustrating the stator unit during the manufacturing process thereof.

After the coil 232 and the terminal pin 241 is connected, the terminal 24 is moved toward the stator 23 sides as shown in FIG. 7 (in other words, the sleeve housing 222 is press-fitted into the terminal 24 further). Whereby, the common terminal pins 241a or the independent terminal pins 241b, with the pin supporting portion 242, moves relative to a plurality of coils 232 along the outer side face 220 of the sleeve housing 222 (step S15). As explained above, in the stator unit 2, the outer side face 220 of the sleeve housing 222 guides the plurality of terminal pins 241 and the pin supporting portion 242 in the center axis J1 direction.

In manufacturing of the stator unit 2, during the process in which the terminal 24 is brought close to the stator 23, the pin supporting portion 242, with the plurality of the terminal pins 241, is rotated into the circumferential direction, centering on the center axis J1, along the outer side face 220 of the sleeve housing 222. By rotating the pin supporting portion 242, the distance between the coils 232 and the terminal pins 241 in the circumferential direction grows. As a result, loosening of the wire between the coils 232 and the terminal pins 241, which grows as the terminal 24 and the stator 23 come to close, is prevented.

Figure 8:
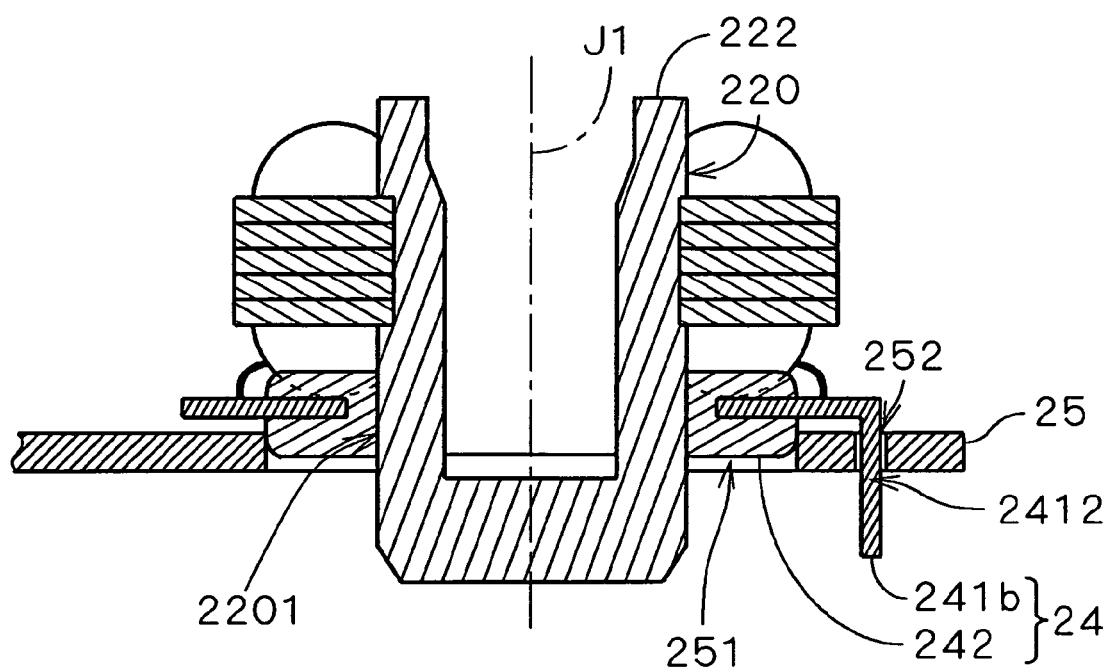
FIG. 8 is a view illustrating the stator unit during the manufacturing process thereof.

After the terminal 24 is brought close to the stator 23 appropriately (see FIG. 7), the bottom end portion of the sleeve housing 222 (i.e., the pin supporting portion 242 side) and the bottom portion of the pin support portion 242 of the terminal 24 are inserted into the circuit board opening 251 of the circuit board 25 (see FIG. 8). At the same time, the substrate joints 2412 of three independent terminal pins 241b are inserted into three substrate bores 252 of circuit board 25 respectively.

After the circuit board 25 is attached to the sleeve housing 222, the bottom portion of sleeve housing 222 that projects from a bottom face of the circuit board 25 is inserted into the base opening 211 of the base portion 21 (see FIG. 1). Therefore, the sleeve housing 222, with the stator 23, the terminal 24 and the circuit board 25, is attached to the base portion 21 (step S17).

Then, substrate joints 2412 of three independent terminal pins 241b, inserted in three base bores 212 of base portion 21, are electrically connected to the electrodes on the bottom face of the circuit board 25 with solder (step S18). Afterward, the sleeve 221 is press-fitted into the sleeve housing 222, and manufacturing of the stator unit 2 is finished. Meanwhile, the sleeve 221 may be attached to the sleeve housing 222 anytime after the chemical conversion coating process to the stator core 231.

In manufacturing of the sleeve unit 2, an attachment process of the independent terminal pins 241b to the circuit board 25 may be performed between the attachment process of the sleeve housing 222 and the circuit board 25, and the attachment process of the sleeve housing 222 and the base portion 21. The circuit board 25 may be attached to the base portion 21 beforehand. In this case, the sleeve housing 222 is concurrently attached to the circuit board 25 and base portion 21 by inserting the bottom end portion of the sleeve housing 222 into the circuit board opening 251 and the base opening 211.

As explained above, in manufacturing the stator unit 2 of the motor 1, the plurality of terminal pins 241 may move relative to the plurality of coils 232 along the outer circumferential face 220 of the sleeve housing 222, acting as a guide portion 2201. In other words, in the assembled motor 1, when the base portion 21 and the circuit board 25 are alienated from the plurality of the terminal pins 241 by detaching the base portion 21 and the circuit board 25 from the sleeve housing 222, the plurality of terminal pins 241, with the pin supporting portion 242, may move relative to the plurality of coils 232 along the outer side face 220 of the sleeve housing 232 while the wire from the plurality of coils 232 is connected to the plurality of the terminal pins 241.

By virtue of the configuration, in manufacturing of the stator unit 2, the wires from the coils 232 may be easily twined to the terminal pins 241 by arranging the plurality of terminal pins 241 in a axially downwardly spaced manner from the plurality of the coils 232 during the twining process of the wires from the coils 232 to the terminal pins 241. In addition, by moving the terminal pins 241 connected to the coils 232 along the outer side face 220 of the sleeve housing 222 after the wires are twined to the terminal pins 241, the terminal pins 241 may be brought close to the coils 232 without applying the tension on the wires. Therefore, it is possible to make the motor 1 thin and to prevent the wire from being cut.

Moreover, in the manufacturing method explained above, the axial distance between the terminal pins 241 and the coils 232 may be set as wide as the nozzle of the winding machine can be inserted. Therefore, in manufacturing of the micro-motor, it is possible to use the winding machine to twin the wires to the terminal pins 241. As explained above, the wire-twining process can be mechanized (automated), and that leads to improve the work efficiency of manufacturing the stator unit 2.

Thus, according to the manufacturing method explained above, even in manufacturing the micro motor 1, the stator 23 and the circuit board 25 may be easily connected by using the winding machine while preventing the open circuit of the wires, and manufacturing of the stator unit 2 can be facilitated. Therefore, the aforementioned manufacturing method is suitable for manufacturing of the micro-motor, in which winding wires by the winding machine is difficult according to the conventional manufacturing method. More particularly, the aforementioned manufacturing method is more suitable for the micro-motors, such as those in which the outer diameter of the stator core is a less than 8 mm, and those in which the distance between the bottom face of the stator core and the upper face of the circuit board is less than 1.5 mm.

In the stator unit 2, the plurality of terminal pins 231 are unitarily supported by the pin supporting portion, therefore, it is possible to unitarily move the plurality of the terminal pins 231 relative to the plurality of coils 232. As a result, manufacturing of the stator unit 2 is facilitated. Moreover, the plurality of terminal pins 241 may be easily attached to the sleeve housing 222. In manufacturing of the stator unit 2, by approximating the stator 23 and the terminal 24 with rotating the terminal 24 into the circumferential direction, the wires connecting the terminal pins 241 and the coils 232 are not overly loosened when the terminal pins 241 are brought close to the stator 23.

In the stator unit 2, the terminal 24 may be easily formed by connecting the plurality of terminal pins 241 and the pin supporting portion 242 firmly by insert molding. In the terminal 24, three common terminal pins 241a, to which common ends of three wires are connected, may be easily connected with the common terminal joint 243. As a result, the common ends of the wires may be easily and securely connected each other compared with the case in which the three wires are twisted and connected with solder.

In the terminal 24, each of the plurality of terminal pins 241 has the wire connecting portion 2411 extending into the radial direction centering on the center axis J1, and each of the teeth 233 extends into the direction same as that the corresponding wire connection portion 2411 extends. By virtue of the configuration, the wire-winding direction on the terminal pins 241 may be same to those on the teeth 233. Therefore, the wire from the coil 233 may be easily twined on the terminal pins 241.

In the independent terminal pins 241b, the wire connecting portion 2411 is not directly heated when the independent pins 241b are attached to the circuit board because the substrate joint 2412 is arranged separately from the wire connecting portion 2411. Therefore, during the connection of the circuit board 25, it is possible to prevent the heat from influencing the connection between the independent terminal pins 241b and the coils 232.

In the terminal 24, the substrate joints 2412 of the independent pins 241b, axially extending, are inserted into the substrate bores 252 on the circuit board 25 and are connected to the circuit board 25. As a result, the terminal 24 and the circuit board 25 may be easily aligned, which leads that the independent terminal pins 241b may be easily connected to the circuit board 25.

In addition, by arranging the substrate joints 2412 at an outer position from the wire connecting portions 2411, the substrate joints 2412 are not fully covered completely by the stator 23 when the sleeve housing 222 is inserted into the circuit board 25. As a result, the substrate joints 2412 may be easily inserted into the substrate bores 252 of the circuit board 25, and the independent terminal pins 241b may be easily connected to the circuit board 25.

Meanwhile, by virtue of the configuration in which the substrate joints 2412 are disposed the outer position from the wire connecting portions 2411, the bottom portion of the pin supporting portion 242 is arranged in the circuit board opening 251 of the circuit board 25. Therefore, the stator unit 2 and the motor 1 may be made thin further. Moreover, by virtue of the configuration in which the bottom portions of the coils 232 are arranged within the concave portion provided on the upper side of the pin supporting portion 24, the stator unit 2 and the motor 1 may be made thin further.

In the stator unit 2, the stator core 231 (i.e., the plurality of the teeth 233 and the core back 234) may be securely attached to the outer side face 220 of the sleeve housing 222 with the great accuracy by insert molding. As a result, the positional difference of the stator core 231 relative to the sleeve housing 222 may be reduced (or minimized), which leads to stabilize the performance of the motor 1.

In the aforementioned manufacturing method, the insulation layer is formed on the surface of the teeth 233 after the stator core 231 is attached to the sleeve housing 222. In the aforementioned manufacturing method, unlike press-fitting the stator core into the sleeve housing after forming the insulation layer on the surface on the stator core, the thickness of the insulation layer formed on the attachment portion of the stator core does not influence the press-fitting strength. Therefore, the teeth 233 which are attached to the outer side face 220 of the sleeve housing 222 and have the insulation layer on the surfaces may be easily manufactured. As a result, the productivity of the stator unit 2 may be improved.

Second Embodiment of the Present Invention

Figure 9:
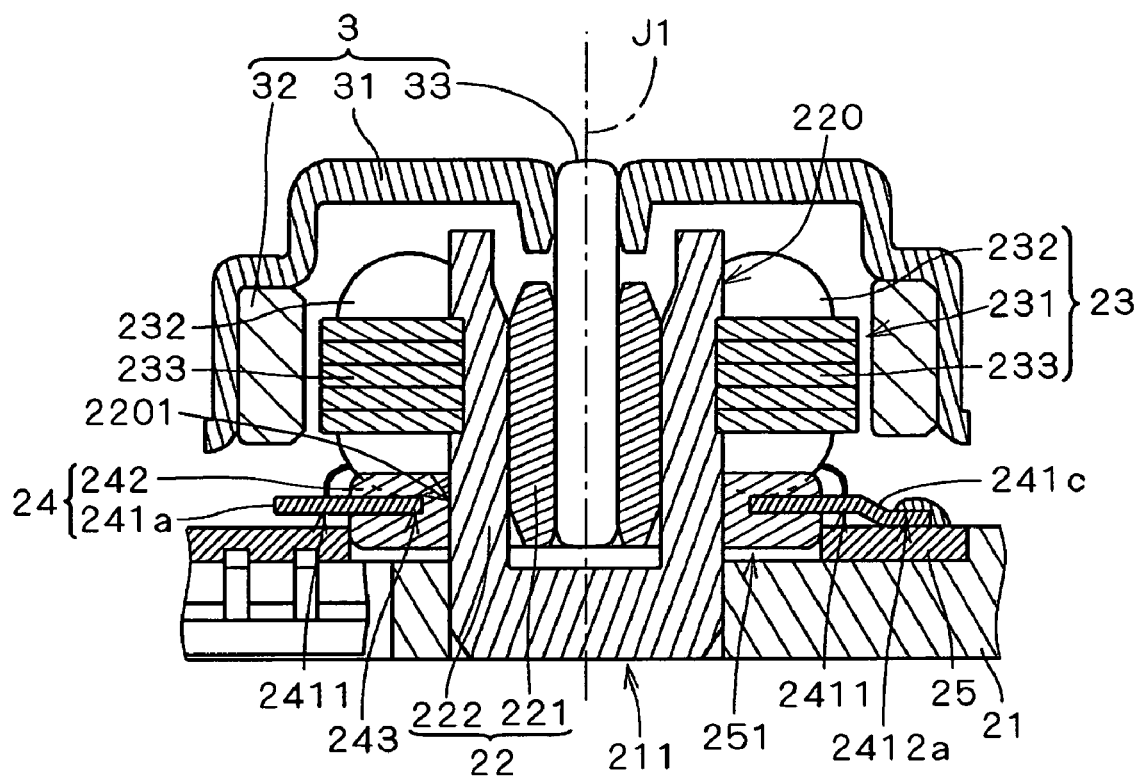
FIG. 9 is a vertical sectional view illustrating a motor according to a second preferred embodiment of the present invention.

Next, a micro-motor 1a according to a second preferred embodiment of the present invention will be explained. FIG. 9 is a cross sectional view illustrating the motor 1a. As shown in FIG. 9, the motor 1a includes independent terminal pins 241c which are different in their shape from those illustrated in FIGS. 1 and 3. The rest of the configurations are the same as those illustrated in FIGS. 1 to 3, and are labeled with the same reference marks in the explanation that follows.

As indicated in FIG. 9, the motor 1a includes the stator unit 2 and the rotor unit 3. The rotor unit 3 is rotatably supported on the stator unit 2, with the center axis J1 as center, via a bearing mechanism employing hydrodynamic pressure by the agency of lubricating oil. The configuration of the bearing mechanism of motor 1a is the same as that described in the first preferred embodiment of the present invention. The rotor unit 3 includes the rotor hub 31 and the shaft 33, and the stator unit 2 includes the base portion 21, the sleeve unit 22, the stator 23, the terminal 24 and the circuit board 25.

Likewise the first preferred embodiment of the present invention, the sleeve unit 22 includes the sleeve 221 that is the oil impregnated bearing and the resin sleeve housing 222 into which the sleeve 221 is press-fitted and fixed. The sleeve unit 22 is inserted into a base opening 211 formed on the base portion 21 and is attached to the base portion 21. The stator 23 includes the stator core 231 and the plurality of coils 232. The stator core 231 is attached to the outer side face 220 of the sleeve housing 222 by insert molding, the sleeve housing 222 centering on the center axis J1 and extending into axial direction.

In the terminal 24 of the motor 1a, the plurality of terminal pins 291a and 241c, a plurality of conductive metal pieces (six pieces in this preferred embodiment), to which the end portions of the wires from the plurality of coils 232 are electrically connected, are provided on the base-side portions of the plurality of the coils 232. Each of a plurality of terminal pins 241 (i.e., common terminal pins 241a and independent terminal pins 241c) extends in the radial direction centering on the center axis J1. Each of the terminal pins 241 includes a wire connecting portion 2411, to which the wire from the corresponding coil 232 is electrically connected by twining the wire.

Each of the independent terminal pins 241c includes a substrate joint 2412a. At the outside portions of the wire connecting portions 2411 (i.e., the farther side from the center axis J1), the substrate joints 2412 extend into the outward direction, away from the center axis J1, and substantially vertical to the center axis J1. Then the substrate joints 2412 are electrically connected to the electrodes on the upper face of the circuit board 25. Meanwhile, each of the independent terminal pins 241c is bent at a radially outside portion from the wire connecting portion 2411, such that each of the substrate joints 2412a, substantially parallel to the upper face of the circuit board 25, is brought close to the circuit board 25.

Likewise the first preferred embodiment, the terminal 24 includes the substantially annular pin supporting portion 242, unitarily supporting the terminal pins 241 with insulating the terminal pins 241 each other. The common terminal joint 243, unitarily supporting the three common terminal pins 241a and electrically connecting them, is provided within the pin supporting portion 242. The pin supporting portion 242 is made of resin. In addition, the pin supporting portion 242, and the plurality of the terminal pins 241 and the common terminal joint 243 are connected by insert molding.

In the stator unit 2, the pin supporting portion 242 is attached to the outer side face 220 of the substantially cylindrical sleeve housing 222, and the bottom portion of the pin supporting portion 242 is arranged in the circuit board opening 251 of the circuit board 25. The concave portion is provided on the upper portion of the pin supporting portion 242, corresponding to each of coils 232, and the bottom portions of the coils 232 are arranged within the concave portion.

Next, manufacturing of the sleeve unit 2 of the motor 1a will be explained. The manufacturing processes of the stator unit 2, other than the process to connecting the independent terminal pins 241c to the circuit board 25, are the same as those explained in the first preferred embodiment (see FIG. 4). Therefore, explanations about the processes, other than connecting the independent terminal pins 241c to the circuit board 25, will be simplified.

In the manufacturing process of the stator unit 2, firstly the sleeve housing 222 is formed by insert molding and then, the plurality of teeth 233 are attached to the outer side face 220 of the sleeve housing 222 (see step S11 in FIG. 4). After forming the insulation layer on the surfaces of the teeth 233, the sleeve housing 222 is press-fitted into the pin supporting portion 242 of the terminal (steps S12 and S13).

Subsequently, after forming the coils 232 by winding the wires around the teeth 233 with the winding machine, the winding machine moves toward the terminal 24 which is arranged below the stator core 231 with the space maintained between the stator core 231 and thereof, and twins the wires to the wire connecting portions 2411. Afterwards, the wires are electrically connected to the terminal pins 241 by fusing. Then, six coils 232 are formed on six teeth 233 respectively, and the wire from each coil 232 is electrically connected to the terminal pins 241 corresponding to the each coil 232 (step S14).

After the coils 232 and the terminal pins 241 are connected, the terminal 24 is moved toward the stator 23 sides with rotating in the circumferential direction. Therefore, the plurality of terminal pins 241 are brought close to the plurality of the coils 232 (step S15).

Then, the bottom end portion of the sleeve housing 222 are inserted into the circuit board opening 251 of the circuit board 25 and the base opening 211 of the base portion 21, and are fixed (steps S16 and S17). Then, substrate joints 2412 of three independent terminal pins 241b are electrically connected to the electrodes on the upper face of the circuit board 25 with solder (step S18). Afterward, the sleeve 221 is press-fitted into the sleeve housing 222, and manufacturing of the stator unit 2 is finished.

As explained above, in manufacturing the stator unit 2 of the motor 1a, the plurality of terminal pins 241 (i.e., the common terminal pins 241a and the independent terminal pins 241c) are arranged in a spaced manner from the plurality of the coils 232. By virtue of the configuration, the wires from the coils 232 are easily twined to the terminal pins 241.

In addition, by approximating the terminal pins 241 to the coils 232 along the outer side face 220 of the sleeve housing 222 after twining the wire to the terminal pins 241, the stator unit 2 may be made thin with preventing the open circuit of the wires.

Moreover, in manufacturing of the micro-motor 1a, the wires may be twined around the terminal pins 241 with the winding machine. Therefore, the work efficiency of manufacturing the stator unit 2 may be improved.

Likewise the first preferred embodiment, in manufacturing the stator unit 2, the plurality of terminal pins 241 may unitarily move relative to the plurality of coils 232. As a result, manufacturing of the stator unit 2 is facilitated. By approximating the stator 23 to the terminal 24 with rotating the terminal 24 into the circumferential direction, the wires connecting the terminal pins 241 and the coils 232 are not overly loosened when the terminal pins 241 are brought close to the stator 23.

In the stator unit 2, the terminal 24 may be easily formed by connecting the plurality of terminal pins 241 and the pin supporting portion 242 firmly by insert molding. In the stator 24, three common terminal pins 241a may be easily connected with the common terminal joint 243, therefore the common ends of the wires may be easily connected each other.

Moreover, in the terminal 24, the wire connecting portions 2411 of the terminal pins 241 extend into the radial direction, therefore the wires from the coils may be easily twined to the terminal pins 241.

In the independent terminal pins 241c, the independent terminal pins 241c may be easily connected to the circuit board because the substrate joints 2412a extend into the direction, substantially parallel to the upper face of the circuit board 25, at the outer portion of the wire connecting portions 2411 and because the substrate joints 2412a are connected to the circuit board 25 at outside of the stator 23 in the plain view.

Meanwhile, likewise the first preferred embodiment, since the substrate joints 2412a are arranged in different positions from those of the wire connecting portions 2411. Therefore, during the connection of the circuit board 25, it is possible to prevent the heat from influencing the connection between the independent terminal pins 241b and the coils 232. Moreover, by virtue of the configuration in which the bottom portion of the coils 232 are arranged within the concave portion provided on the upper side of the pin supporting portion 24, the stator unit 2 and the motor 1 may be made thin further.

In the stator unit 2, the stator core 231 may be securely attached to the outer side face 220 of the sleeve housing 222 with the great accuracy by insert molding, which leads to stabilize the performance of the motor 1. Moreover, the teeth 233 attached to the outer side face 220 of the sleeve housing 222 and coated by the insulation layer may be easily formed; therefore the productivity of the stator unit 2 may be improved.

Third Preferred Embodiment

Figure 10:
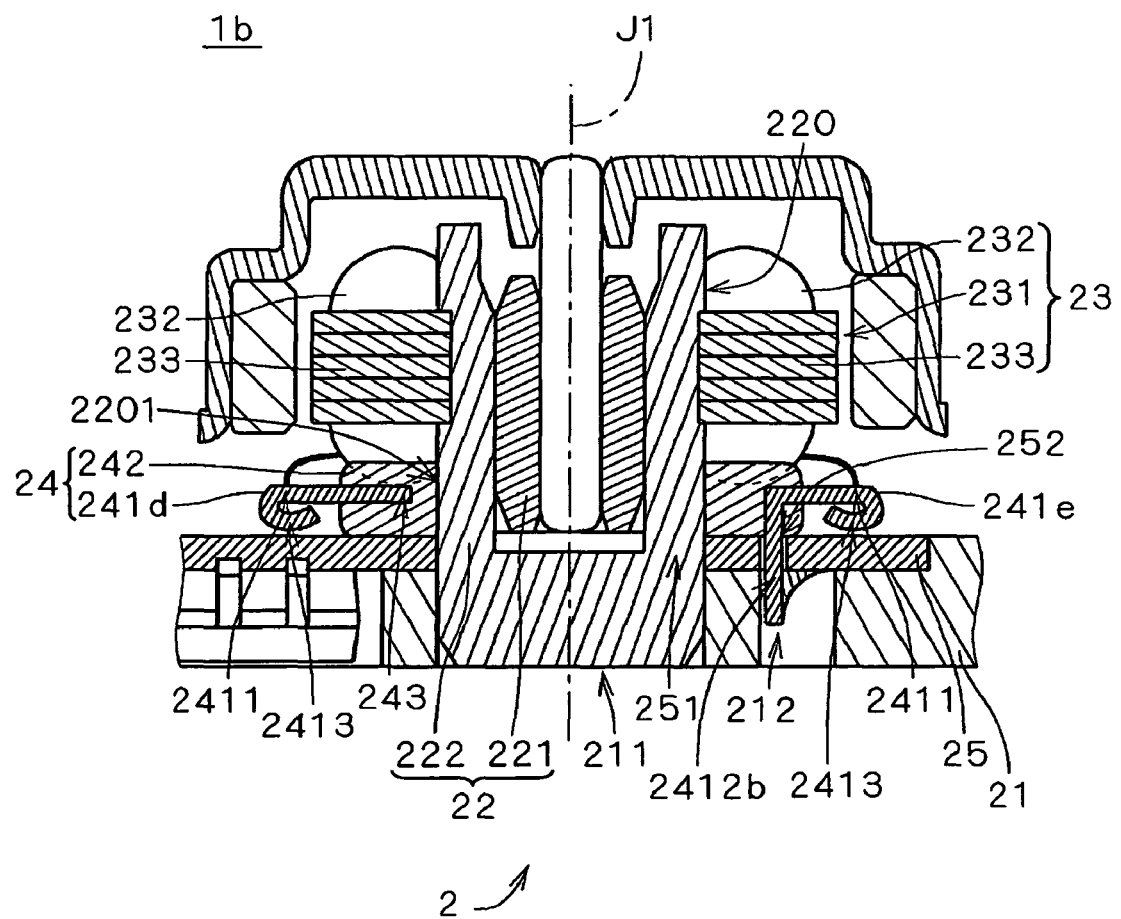
FIG. 10 is a vertical sectional view illustrating a motor according to a third preferred embodiment of the present invention.

Next, a micro-motor 1b according to a third preferred embodiment of the present invention will be explained. FIG. 10 is a cross sectional view illustrating the motor 1b. As shown in FIG. 10, the motor 1b includes the common terminal pins 241d and independent terminal pins 241e which are different in their shape from those illustrated in FIGS. 1 and 3. The rest of the configurations are the same as those illustrated in FIGS. 1 to 3, and are labeled with the same reference marks in the explanation that follows.

As shown in FIG. 10, in the terminal 24 of the motor 1b, three terminal pins 241d and three independent terminal pins 241c, which are electrically connected to the coils 232, are provided on the base-side portions of the plurality of the coils 232.

Each of a plurality of terminal pins 241 (i.e., common terminal pins 241d and independent terminal pins 241e) extends in the radial direction centering on the center axis J1 and includes the wire connecting portion 2411 to which the wire from each of the coil 232 is electrically connected by twining the wire. Moreover, each of terminal pins 241 is folded at an outside portion (further side from the center axis J1) of the wire connecting portion 2411, such that tip end of the each terminal pin 2413 is arranged below the circuit board 25. Hereinafter, the tip end portions 2413 are referred to as folding portions 2413.

Meanwhile, each of three independent terminal pins 241e is bent about 90 degree at a radially inside portion from the wire connecting portion 2411. The bent portions 2412b are inserted into substrate bores 252 provided on the circuit board 25 and the base bores 212 of base portion 21, having axially crossover portions each other. Then, the bent portions 2412b are electrically connected to electrodes on a bottom face of the circuit board 25 with solder. Hereinafter, the portions 2412b of the independent terminal pins 241e, bent at the inner portions of the wire connecting portions 2411 so as to axially extend, are referred to as substrate joints 2412b.

Likewise the first preferred embodiment, the terminal 24 includes the substantially annular pin supporting portion 242, unitarily supporting the terminal pins 241 with insulating the terminal pins 241 each other. The common terminal joint 243, unitarily supporting the three common terminal pins 241a and electrically connecting them, is provided within the pin supporting portion 242. The pin supporting portion 242 is made of resin. In addition, the pin supporting portion 242, and the plurality of the terminal pins 241 and the common terminal joint 243 are connected by insert molding.

Next, manufacturing of the sleeve unit 22 of the motor 1b will be explained. The processes for manufacturing the stator unit 2, other than the process of connecting the wires to the terminal pins 241, are similar to those explained in the first preferred embodiment (see FIG. 4). Therefore, explanations about the processes, other than connecting the wire to the terminal pins 241, will be simplified.

In the manufacturing process of the stator unit 2, the plurality of teeth 233 are attached to the outer side face 220 of the sleeve housing 222 by insert molding, the insulation layer is formed on the surfaces of the teeth 233, and then, the sleeve housing 222 is press-fitted inside the terminal 24 (see steps S11 to S13 in FIG. 4).

Subsequently, the coils 232 are formed with the winding machine, and the wires are twined to the wire connecting portions 2411 of the terminal pins 241 at the terminal 24, arranged below the stator core 231 with the space maintained therebetween.

After twining the wires to the terminal pins 241, the folding portions 2413 of the terminal pins 241 are downwardly folded and then are subsequently inwardly folded toward the center axis J1. Therefore, the folding portions 2413 face the wire connecting portions 2411 with nipping the wires therebetween. Afterwards, the wires are electrically connected to wire connecting portions 2411 and the folding portions 2413 of the terminal pins 241 by fusing. Then, six coils 232 are formed on six teeth 233 respectively, and the wire from each coil 232 is electrically connected to the terminal pin 241 (step S14).

After the coils 232 and the terminal pins 241 are connected with the wires, the plurality of terminal pins 241 are brought close to the plurality of coils 232 with rotating the terminal pins 241. Then, the bottom end portion of the sleeve housing 222 is inserted into the circuit board opening 251 of the circuit board 25 and the base opening 211 of the base portion 21, and the bottom end portion is fixed thereto (steps S15 to S17). Then, substrate joints 2412b of three independent terminal pins 241b are inserted into the circuit board openings 252 of the circuit board 25 and the base bore 212 of the base 21, and are electrically connected to the electrodes on the upper face of the circuit board 25 with solder (step S18). Afterward, the sleeve 221 is press-fitted into the sleeve housing 222, and manufacturing of the stator unit 2 is finished.

As explained above, likewise the first preferred embodiment of the present invention, in manufacturing the stator unit 2 of the motor 1a, the wires from the plurality of coils 232 may be easily twined to the plurality of terminal pins 241 (i.e., the common terminal pins 241d and the independent terminal pins 241e), and the stator unit 2 may be made thin with preventing the open circuit of the wires. Moreover, the wires may be twined around the terminal pins 241 with the winding machine; therefore the work efficiency of manufacturing the stator unit 2 may be improved.

In the motor 1b, the folding portions 2413, arranged outer from the wire connecting portions 2411 of the terminal pins 241, are folded toward the center axis J1 after the wires are wound around the terminal pins 241. By virtue of the configuration, the wires are securely held so that the wires do not shift from the wire connecting portions 2411 and do not fall off from the terminal pins 241.

Moreover, the wires may be easily electrically connected to the terminal pins 241 by fusing the wires with sandwiching them between the wire connecting portions 2411 and the folding portions 2413.

In manufacturing the stator unit 2 of the motor 1b, the wires are securely held and do not fall off from the terminal pins 241. Therefore, the wires may be connected to the terminal pins 241 after wires are twined to all of the terminal pins 241.

The wire may be connected to the terminal pins 241 after the sleeve housing 222 is attached to the circuit board 25 and the base 21.

Fourth Preferred Embodiment

Figure 11:
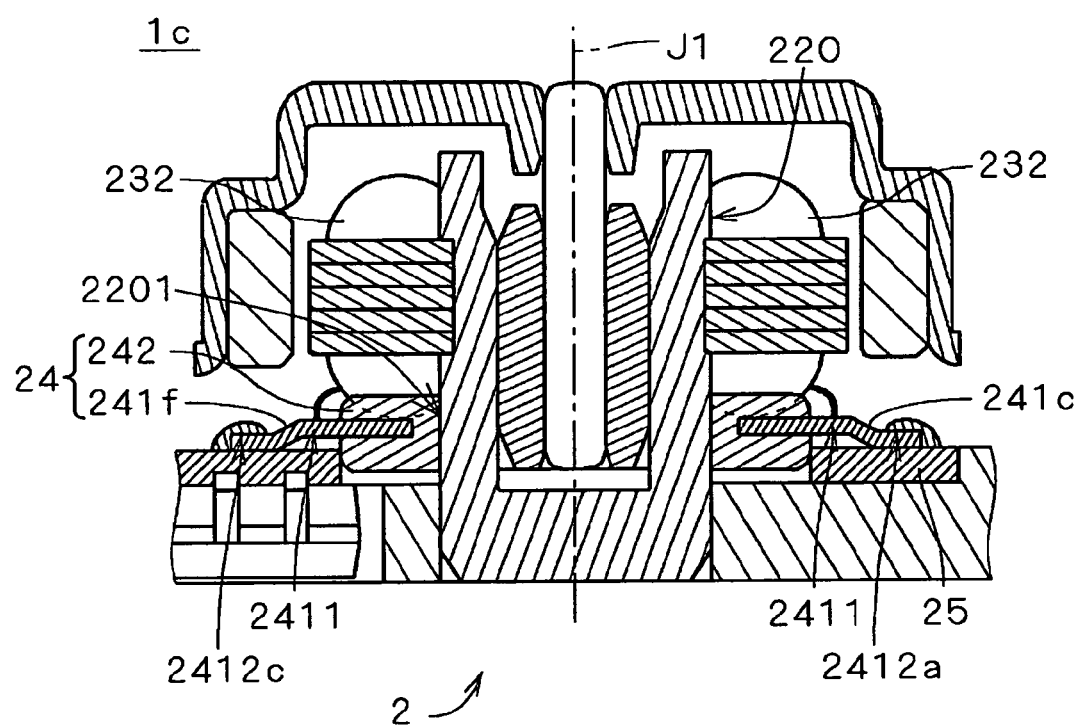
FIG. 11 is a vertical sectional view illustrating a motor according to a fourth preferred embodiment of the present invention.
Figure 12:
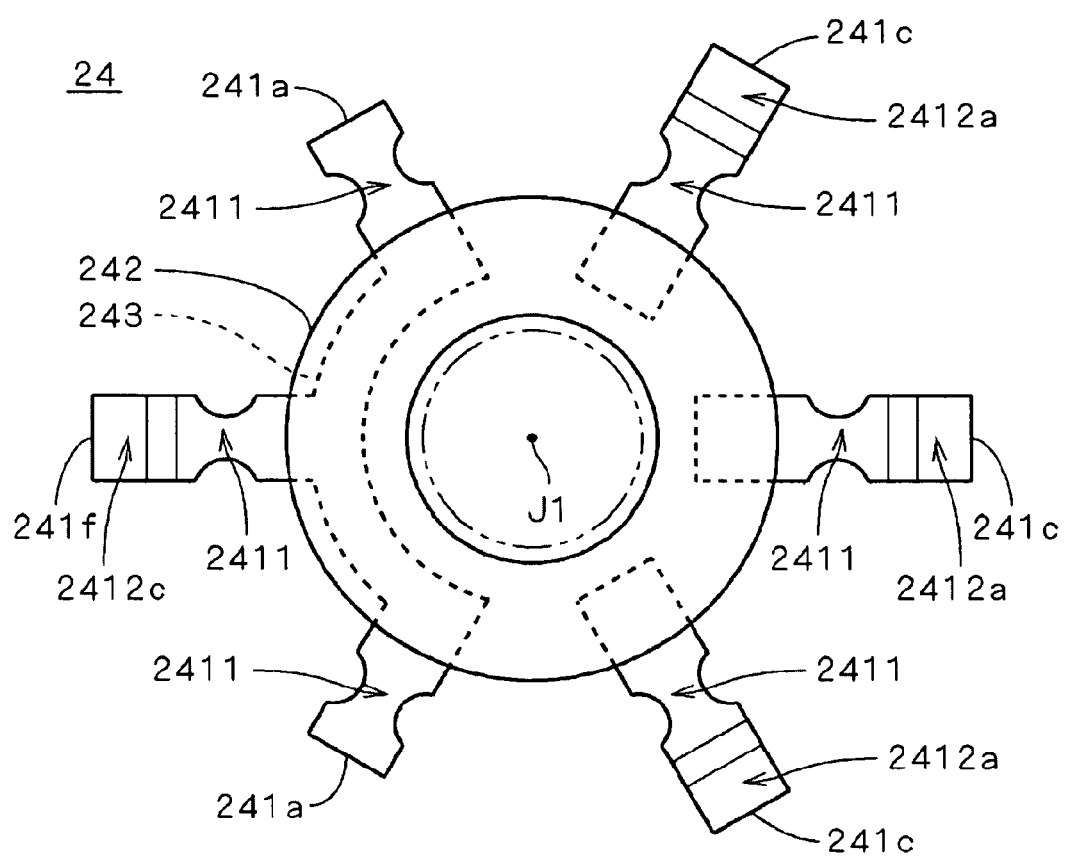
FIG. 12 is a plain view illustrating a terminal.

Next, a micro-motor 1c according to a fourth preferred embodiment of the present invention will be explained. FIG. 11 is a vertical cross sectional view illustrating the motor 1c, and FIG. 12 is a plain view illustrating the terminal 24. In the motor 1c, the stator 23, the terminal 24 and the circuit board 25 constitute a three-phase half-wave circuit. As shown in FIGS. 11 and 12, the terminal 24 including a common terminal pin 241f whose shape is different from that of the common terminal pin 241a as shown in FIG. 9 is attached to the circuit board 25. The rest of the configuration is the same as that of FIG. 9, and is labeled with the same reference marks in the explanation that follows.

As shown in FIGS. 11 and 12, the terminal 24 of the motor 1c includes two common terminal pins 241a, a common terminal pin 241f, and three independent terminal pins 241c. Each of the plurality of terminal pins 241 (i.e., the common terminal pins 241a, the common terminal pin 241f and the independent terminal pins 241e) extends in the radial direction centering on the center axis J1. In addition, the terminal pins 241 include the wire connecting portions 2411 to which the wires from the coils 232 are electrically connected by twining the wire.

Likewise the second preferred embodiment, each of the independent terminal pins 241c includes the substrate joint 2412a at the outside of the wire connecting portion 2411. The substrate joints 2412 extend into the outward direction, away from the center axis J1, and are electrically connected to the electrodes on the upper face of the circuit board 25. Meanwhile, each of the independent terminal pins 241c is bent at a radially outside portion from the wire connecting portion 2411 such that the substrate joint 2412a, substantially parallel to the upper face of the circuit board 25, is brought close to the circuit board 25.

The common terminal pins 241a and the common terminal pin 241f are electrically connected with the common terminal joint 243, and are unitarily supported with three independent terminal pins 242 by the pin supporting portion 242.

Likewise the independent terminal pins 241c, the common terminal pin 241f includes a substrate joint 2412c at the outside of the wire connecting portion 2411. The substrate joint 2412c extends into the outward direction, perpendicularly departing from the center axis J1, and is electrically connected to the electrode on the upper face of the circuit board 25. The independent terminal pins 241f is downwardly bent at a radially outside portion from the wire connecting portion 2411, such that the substrate joint 2412c, substantially parallel to the upper face of the circuit board 25, is brought close to the circuit board 25.

Likewise the second preferred embodiment, the terminal 24 includes the pin supporting portion 242, made of resin, unitarily supporting the terminal pins 241 while insulating the terminal pins 241 each other. The pin supporting portion 242, and the plurality of the terminal pins 241 and the common terminal joint 243 are connected by insert molding.

In manufacturing of the stator unit 2 of the motor 1c, concurrently with connecting the independent terminal pins 241c and the circuit board 25 (step S15 in FIG. 4), the substrate joint 2412c of the common terminal pin 241f is electrically connected to the electrode on the upper face of the circuit board 25 by soldering. The rest of the processes are similar to those explained in the second preferred embodiment, therefore detailed explanation will be omitted.

Likewise the second preferred embodiment, in manufacturing the stator unit 2 of the motor 1c, the wires from the plurality of coils 232 may be easily twined to the terminal pins 241. Moreover the stator unit 2 may be made thin with preventing the open circuit of the wires. Moreover, the wires may be twined around the terminal pins 241 with the winding machine; therefore the work efficiency of manufacturing the stator unit 2 may be improved.

In the motor 1c, the substrate joint 2412c of the common terminal pin 241f extends into the direction, substantially parallel to the upper face of the circuit board 25, at the outer portion of the wire connecting portion 2411, and is connected to the circuit board 25 at the outside of the stator 23 in the plain view. As a result, the common terminal pin 241f may be easily connected to the circuit board 25.

Meanwhile, it is not necessary too locate the common terminal pin 241f, on which the substrate joint 2412c is provided, in the middle of three common terminal pins. For example, the common terminal pin 241f may be arranged at either side end positions among the three common terminal pins.

Likewise the first preferred embodiment, the substrate joint 2412c may be bent so that the end portion thereof faces to the circuit board 25 at the outward portion from the wire connecting portion 2411. Then, the end portion may be inserted into the bore provided on the circuit board 25 and be electrically connected to the bottom side of the circuit board.

Meanwhile, the substrate joint 2412c may be provided on the common terminal pin 243. In this case, the substrate joint 2412c is formed to project from the bottom face of the common terminal joint 243 toward the circuit board 25. Then, the substrate joint 2412c may be inserted into the bore provided on the circuit board 25 and be electrically connected to the bottom side of the circuit board 25.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

For example, in the motor 1a according to the second preferred embodiment of the present invention, the independent terminal pins 241c may be bent toward the circuit board 25 between the outer side face of the pin supporting portion 242 and the wire connecting portions 2411, and then it may be connected to the circuit board 25 at the portions where terminal pins 241c are bent.

In other words, the substrate joints 2412a of the independent terminal pins 241c may be provided at the positions, the center axis J1 side from that of the wire connecting portions 2411. Moreover, in the independent terminal pins 241c, it is preferable to provide the wire connecting portions 2411 and the substrate joints 2412a into separated positions from the viewpoint of controlling the influence of heat applied during the connecting process thereof to circuit board 25. However, the wire connecting portions 2411 may be connected to the circuit board if necessary.

In the aforementioned preferred embodiments of the present invention, the terminal 24 includes three common terminal pins. However, the terminal 24 may includes only one common terminal pin, and the three wires from three coils, which are to be connected to the common terminals, may be connected to the only one common terminal pin. Meanwhile, the terminal 24 may includes two common terminal pins electrically connected each other.

It is preferable to attach the plurality of terminal pins 241 to the pin supporting portion 242 by insert molding. However, other method, such as press-fitting, may be used to attach the terminal pins 241 to the pin supporting portion 242.

It is preferable to attach the plurality of teeth 233 (i.e., the stator core 231) to the sleeve housing 222 by insert molding. However, the teeth 233 may be press-fitted to the sleeve housing 222 or may be fixed to the sleeve housing 222 by adhesive if suitable.

In the terminal 24, it is preferable that the terminal pins 241 extend into the outward direction from the pin supporting portion 242 from the viewpoint of simplifying the twining process of the wires from the coils 232. However, other forms may be applied to the preferred embodiment of the present invention. For example, the wire connecting portion 2411 may downwardly extend from the pin supporting portion 242 if the space outside the stator 23 is limited.

Moreover, the pin supporting portion 242 may be omitted from the stator unit 2. In that case, the terminal pins 241 may be inserted into the concave portion formed on the bottom end face of the sleeve housing 222 so as to project downwardly. After the wires from the coils 232 are twined to the terminal pins 241, the terminal pins 241 may be brought close to the coils 232 by further inserting the terminal pins 241 into the concave portion.

As explained in the aforementioned preferred embodiments of the present invention, from the viewpoint of downsizing the stator unit 2 in the radial direction centering on the center axis J1, it is preferable that the guide portion 2201, which guides the plurality of terminal pins 241 in the direction of center axis J1, is the outer side face 220 of the sleeve housing 222 (which is the outer side face of the sleeve unit 22 as well). However, the guide portion 2201 may be other than the outer side face of the sleeve housing. For example, in case that the bearing mechanism of the motor is constituted by the shaft arranged on the upper face of the base and the sleeve arranged on the bottom face of the rotor hub, the guide portion 2201 for the plurality of the terminal pins may be the outer side face of the cylindrical portion, which is formed on the upper face of the base so as to surround the shaft, to which the stator is attached. Meanwhile, the pin supporting portion may be attached to the base portion, and then, the stator may be attached to the cylindrical portion upwardly extending from the pin supporting portion in an axially movable manner.

In the stator unit 2, the sleeve 221 and the sleeve housing 222 may be unitarily formed as a single piece member.

In the aforementioned preferred embodiments of the present invention, the fluid dynamic bearing is utilized as the bearing mechanism. However, other types of bearings, such as ball bearings, may be utilized as the bearing mechanism.

The number of phases of the electric current that drives the motor is not limited to three, and the configuration and the manufacturing method of the aforementioned stator unit 2 may be applied to such as the single phase and two phase motors. However, the single phase motor do not includes the common terminal pin (and common terminal joint). The common terminal pin and the common terminal joint are provided only for the motor whose number of phases is two or more.

In the motor according to each preferred embodiment of the present invention, at least two of the plurality of terminal pins 241 is connected to the circuit board 25 regardless of the number of phase of the driving current. In case that the half wave circuit is constituted, the substrate joint is provided on the common terminal pins and common terminal joint 243 as shown in the fourth preferred embodiment of the present invention.

The motor according to the preferred embodiments of the present invention may be used, but not limited, for a driving source of the axial fan.

What is claimed is:

1. A method of manufacturing a stator unit for an electronically powered motor which includes a base portion and a rotor rotatably supported via a bearing mechanism around a center axis, comprising:

a) a step of preparing a stator core having a plurality of teeth, radially arranged with centering on the center axis and connected to one another so that relative positions of those teeth are fixed;

b) a step of preparing a terminal having a plurality of terminal pins, radially arranged with centering on the center axis in a manner so that relative positions of those terminal pins are fixed;

c) a step of placing the stator core and the terminal approximately coaxially with an axial interval therebetween;

d) a step of forming a coil by winding a wire around each of the plurality of teeth;

e) a step of electrically connecting wires led from the plurality of teeth to the plurality of terminal pins; and f) a step of bringing the terminal close to the plurality of coils by moving the terminal relative to the plurality of coils along the center axis, wherein the method further comprises a step of preparing a guide portion axially extending with centering on the center axis, wherein the stator core and the terminal are arranged along an outer side face of the guide portion in the step c), and the terminal is moved along the outer side face of the guide portion in the step d).

2. The method of manufacturing a stator unit as set forth in claim 1, wherein the stator unit includes a sleeve unit having a sleeve housing which has a substantially cylindrical shape and a sleeve which is retained at an inner circumferential portion of the sleeve housing, and the guide portion is an outer side face of the sleeve housing.

3. The manufacturing method of a stator unit as set forth in claim 2, wherein the terminal includes a pin supporting portion supporting the plurality of terminal pins so that the relative positions of those terminal pins are fixed.

4. The manufacturing method of a stator as set forth in claim 3, wherein the pin supporting portion is made of resin, and the plurality of terminal pins and the pin supporting portion are jointed by insert molding.

5. The manufacturing method of a stator unit as set forth in claim 3, further comprising a step, prior to the step e), of inserting a sleeve housing into the pin supporting portion having a substantially annular shape.

6. The manufacturing method of a stator unit as set forth in claim 5, further comprising, after the step f):

g) a step of inserting a part of an outer side face of the sleeve housing into a circuit board opening of a circuit board; and h) a step of attaching the outer side face of the sleeve housing to a base portion of the stator unit which retains different parts of the stator unit, wherein the step h) is performed after the step g) or is performed concurrently with the step g).

7. The manufacturing method of a stator unit as set forth in claim 1, the terminal pins are brought close to the coils while the terminal is rotated into a circumferential direction, centering on the center axis, along the outer side face of a sleeve housing in step f).

8. The manufacturing method of a stator unit as set forth in claim 1, wherein the guide portion is made of resin, and the plurality of teeth and the guide portion are jointed by insert molding.

9. The manufacturing method of a stator unit as set forth in claim 8, further comprising a step, between the steps a) and d), of forming an insulating layer on surfaces of the plurality of teeth.

10. The method of manufacturing a stator unit as set forth in claim 1, further comprising a step of providing a circuit board at a position axially lower than the terminal, and a step of electrically connecting at least two of the plurality of terminal pins to a circuit board arranged on the stator unit.

11. The manufacturing method of a stator unit as set forth in claim 10, wherein each of the plurality of terminal pins includes a wire connecting portion, radially extending with centering on the center axis, to which the wire is electrically connected.

12. The manufacturing method of a stator unit as set forth in claim 11, wherein each of the at least two terminal pins includes a substrate joint at one side portion, radially opposite side from another side the wire connecting portion is arranged at.

13. The manufacturing method of a stator unit as set forth in claim 12, wherein the substrate joint is axially extended and is inserted into a circuit board opening on the circuit board.

14. The manufacturing method of the stator as set forth in claim 1, wherein the terminal includes a pin supporting portion supporting the plurality of terminal pins so that the relative positions of those terminal pins are fixed.

15. The manufacturing method of a stator as set forth in claim 14, wherein the pin supporting portion is made of resin, and the plurality of terminal pins and the pin supporting portion are jointed by insert molding.

16. The manufacturing method of the stator unit as set forth in claim 1, wherein the terminal is rotated into a circumferential direction, centering on the center axis, in step f).

17. A method of manufacturing a stator unit for an electronically powered motor which includes a base portion and a rotor rotatably supported via a bearing mechanism around a center axis, comprising:
  a) a step of preparing a stator core having a plurality of teeth, radially arranged with centering on the center axis and connected to one another so that relative positions of those teeth are fixed;
  b) a step of preparing a terminal having a plurality of terminal pins, radially arranged with centering on the center axis in a manner so that relative positions of those terminal pins are fixed;
  c) a step of placing the stator core and the terminal approximately coaxially with an axial interval therebetween;
  d) a step of forming a coil by winding a wire around each of the plurality of teeth;
  e) a step of electrically connecting wires led from the plurality of teeth to the plurality of terminal pins; and
  f) a step of bringing the terminal close to the plurality of coils by moving the terminal relative to the plurality of coils along the center axis, while rotating the terminal in a circumferential direction of a guide portion, centering on the center axis.

* * * * *